Patented June 29, 1954

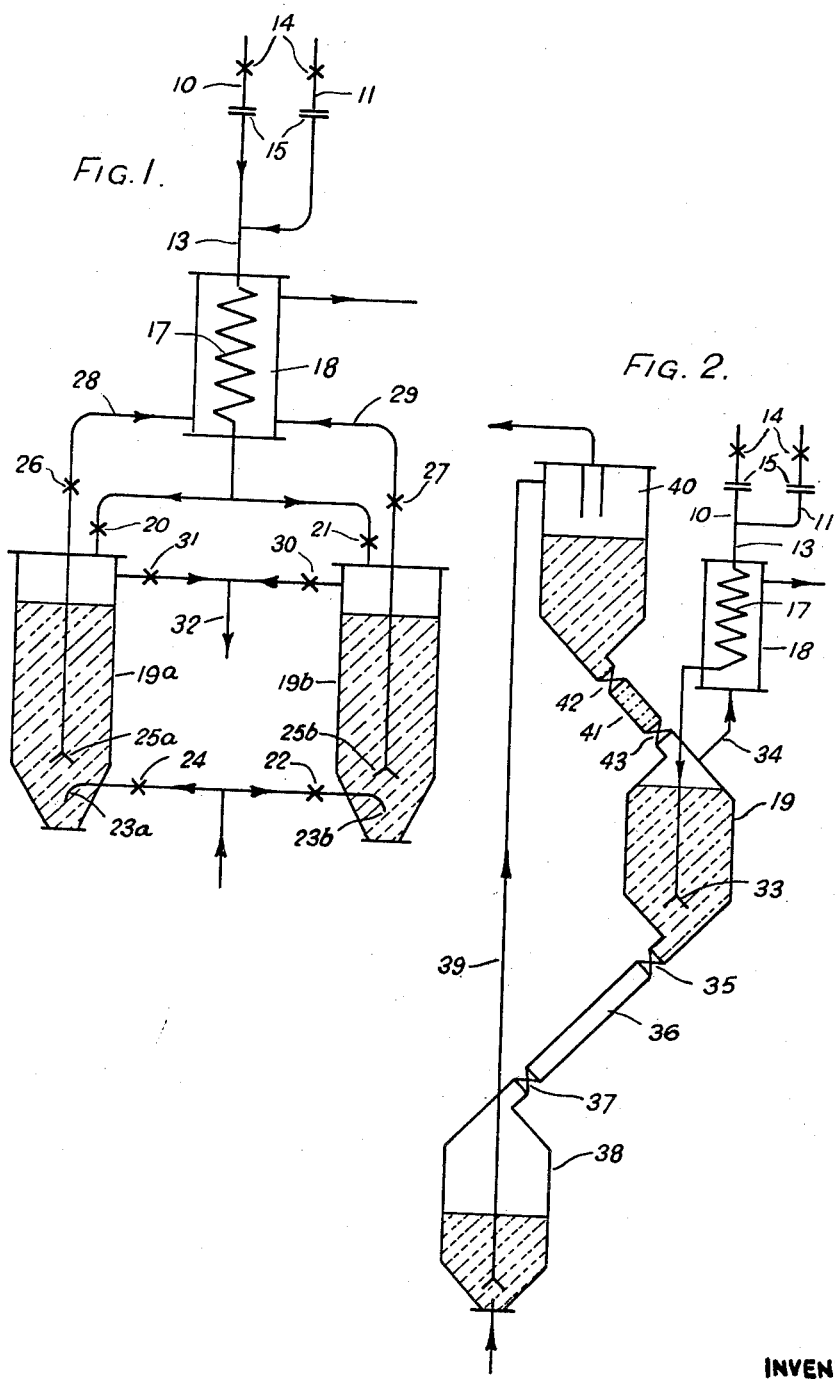

2,682,459

UNITED STATES PATENT OFFICE 2,682,459

PROCESS FOR PRODUCING COMBUSTIBLE GASES FROM HYDROCARBON OILS

Harold Stanier, Westcliff-on-Sea, England

Application December 1, 1949, Serial No. 130,388

7 Claims. (Cl. 48—214)

It is known that combustible gases can be produced by the gasification of hydrocarbon oils in admixture with steam with the aid of a catalyst consisting of or containing an oxide of a metal, such as iron, which acts as an oxygen carrier. A disadvantage of such catalysts is that they tend to carry the decomposition of hydrocarbons so far, especially at high temperatures, as to reduce the content of methane in the resulting gas, methane being a valuable constituent in contributing to the calorific value of the gas.

The present invention is based on the observation that by using as catalysts certain other metal compounds specified below the foregoing disadvantage is considerably reduced or avoided, especially at high temperatures. Accordingly, it is possible by the process of this invention to obtain high yields of combustible gases approximating to town gas in their physical properties and combustion characteristics.

According to this invention, therefore, a process for producing combustible gases from hydrocarbon oils, comprises subjecting a hydrocarbon oil in admixture with steam to the action of a catalyst consisting of aluminum which has been preheated to a temperature of 1000° C., lithium carbonate, sodium carbonate, potassium carbonate, calcium oxide, strontium oxide, barium oxide and magnesium oxide or a mixture of two or more of these metal compounds, by heating the mixture of oil and steam while in contact with the catalyst from 500° C. to a maximum temperature within the range of 750° C. to 1200° C.

Instead of starting with the oxide or carbonate as such, a metal compound or compounds may be used which decomposes or decompose when heated to produce one or more of the above named oxides or carbonates.

The catalyst or compound decomposing to form the catalyst may be used as such, or may be carried on a support or formed into pellets or the like with the aid of a binding agent.

The proportion of steam relatively to that of the hydrocarbon oil determines the calorific value of the gas produced, and also whether or not carbon is deposited on the catalyst and, if so, the amount of such deposit. Thus, the smaller the proportion of steam the higher is the calorific value of the gas and, when the proportion of steam is insufficient to convert all the carbon of the oil into gas, the greater is the amount of carbon deposited. Conversely, the greater the proportion of steam the lower is the calorific value of the gas and the amount of carbon deposited. The proportion of steam advantageously ranges from 30 to 400 per cent. of the weight of the hydrocarbon oil, the actual proportion used depending on the calorific value or the amount of carbon deposit desired.

The mixture of steam and hydrocarbon oil may be passed in any desired manner into contact with the catalyst. It is necessary, however, that the mixture should be subjected to the action of the catalyst at a maximum temperature within the range of 750° C. to 1200° C., and that the mixture should be heated from 500° C. to the maximum temperature while in contact with the catalyst. The mixture may be brought to 500° C. either in the presence of the catalyst or before it comes into contact therewith.

The deposition of some carbon on the catalyst is not disadvantageous, as a part or the whole of the heat required for the catalytic treatment, which involves an endothermic reaction, may be supplied by burning on the catalyst carbon deposited thereon during an earlier catalytic treatment. For this purpose the catalytic treatment and the combustion of carbon deposited on the catalyst may be carried out intermittently by alternately passing the mixture to be treated and then air or oxygen through the catalyst in such manner that each period of combustion raises the temperature of the catalyst sufficiently to supply a part or the whole of the heat required in the succeeding period of catalytic treatment. Alternatively, in order to avoid interrupting the catalytic treatment, a part of the catalyst is withdrawn during the treatment, the catalyst withdrawn is treated with air or oxygen to burn carbon deposited thereon, and the hot treated catalyst is returned to the catalytic treatment zone.

When only a part of the heat required for a catalytic treatment is supplied by the combustion of the carbon deposit on the catalyst, additional heat may be supplied by the introduction of hot combustion gases together with air required for combustion of the carbon. Such hot gases may be produced by burning a mixture of combustible gas and air outside the catalyst vessel.

Advantageously, the mixture of oil and steam is preheated before being subjected to the catalytic treatment by heat exchange with the hot combustible gas produced.

By suitably adjusting the ratio of steam to oil in the mixture to be treated it is possible to produce combustible gas of a composition closely resembling that of town gas of high calorific value. By increasing the proportion of steam a combustible gas of lower calorific value, similar to that of coal gas which has been diluted with water gas, can be produced. In this case, the calorific value of the gas may be increased by subsequently treating it to remove carbon dioxide therefrom.

Two methods of carrying out the process of the invention will be described with reference to the accompanying drawings, in which:

Figure 1 shows diagrammatically an arrangement of apparatus in which the mixture of oil and steam is treated alternately in two catalyst vessels in such manner that while the mixture is being treated in one vessel the carbon deposit is being burned off the catalyst in the other vessel, and Figure 2 shows diagrammatically an arrangement of apparatus in which the mixture is treated continuously in one catalyst vessel while a part of the catalyst is withdrawn to burn off the carbon deposit and the hot treated catalyst is returned to the vessel.

With the arrangement shown in Figure 1, steam is supplied through a pipe 10 and oil through a pipe 11, and the steam and oil unite in the pipe 13. The relative proportions of steam and oil are controlled by valves 14 and flow indicators 15. The mixture of steam and oil then passes through the coil 17 of a heat exchanger 18 in which the mixture is preheated by the hot combustible gas produced in the process. The preheated mixture is then introduced, if necessary, by means of a spray, into one or other of the catalyst vessels 19a or 19b, one of the valves 20 and 21 being closed and the other opened to direct the mixture into the appropriate vessel. Assuming that the mixture is passed into the vessel 19a, the valve 21 is closed, and air, if desired, in admixture with hot combustion gases, is introduced through a valve 22 and pipe 23b into the bottom of the vessel 19b and the valve 24 being closed. The gases produced by the passage of the mixture through the catalyst in vessel 19a leave the vessel through a central gas off-take 25a near the bottom of the vessel, and pass out through a valve 26 and pipe 28 into the heat exchanger 18. The partly cooled gases then pass to coolers and to the usual purification plant. The air introduced into the vessel 19b burns on the catalyst the carbon deposit from a previous treatment, and the resulting hot waste gases are constrained to leave the vessel through a valve 30, since the valves 21 and 27 are closed. The hot waste gases are passed through a pipe 32 to a waste heat boiler in order to generate steam required for the process. The heat evolved in the vessel 19b by the combustion of the carbon deposit may raise the temperature of the catalyst to that required for the subsequent treatment therein of the mixture of oil and steam. If the carbon deposit is insufficient for this purpose, hot combustion gases produced by burning a mixture of combustible gas and air outside the vessel may be introduced with the air required for combustion of the carbon.

When the temperature of the catalyst in the vessel 19a has fallen to such an extent that further treatment would lead to a gas not having the desired composition and properties, the mixture of oil and steam is shut off from the vessel 19a and introduced into the vessel 19b, and the air, if desired, in admixture with hot combustion gases, is shut off from the vessel 19b and introduced into the vessel 19a. This is done by opening the valves 21, 24, 27 and 31, and closing the valves 20, 22, 26 and 30. The change over from one vessel to the other is repeated so that the mixture is treated alternately in the two vessels and combustible gas is produced continuously.

With the arrangement shown in Figure 2, steam and oil is supplied through the pipes 10 and 11, valves 14, flow indicators 15, pipe 13 and heat exchanger 18 as described in connection with Figure 1 to a catalyst vessel 19. The mixture of oil and steam enters the catalyst mass through the central inlet 33 near the bottom of the vessel 19, and the combustible gas produced leaves the vessel by way of the pipe 34 and passes through the heat exchanger 18 to preheat the incoming mixture as described in connection with Figure 1. In order to remove carbon deposited on the catalyst, portions of the catalyst are periodically withdrawn from the bottom of the vessel 19 by opening a valve 35 to admit the catalyst into a tube 36 closed at the bottom by a valve 37, and, after closing the valve 35, opening the valve 37 to discharge the portion of the catalyst in the tube 36 into a vessel 38. Air alone, or a mixture of air and hot combustion gases, is introduced into the bottom of the vessel 38 in such manner that the catalyst is carried upwards by the air stream through a tube 39. During the passage of the catalyst through the tube 39 carbon on the catalyst is burned, and the temperature of the catalyst is thereby raised to that required for the catalytic treatment. The catalyst carried up the tube 39 is introduced tangentially into the cylindrical chamber of a cyclone separator 40 in which a whirling motion is imparted to the gas so that the catalyst separates and collects in the lower part of the cyclone separator and the gas passes centrally out of the upper part thereof. The catalyst, from which carbon has thus been removed, is periodically returned to the catalyst vessel 19 through the tube 41 by successively opening and closing valves 42 and 43 in a manner similar to that of the valves 35 and 37. The hot waste gas leaving the cyclone separator 40 is used to generate steam required for the process in a waste heat boiler.

The following examples illustrate the invention, the parts being by weight:

*Example 1*

The oil treated was a gas oil which commenced to boil at 260° C., and of which 94 per cent. boiled below 350° C., and which had a specific gravity of 0.87 and a calorific value of 1.67 therms per gallon. A mixture of steam and the oil in the ratio of 0.43:1 part was passed into a reaction tube maintained by external heating at an internal temperature of 970° C. The reaction tube was charged with pellets of ⅕ inch diameter of a calcium oxide catalyst prepared by calcining a mixture of 100 parts of calcium carbonate and 6 parts of silica at a temperature of 1250° C., a small quantity of calcium silicate being formed to serve as a binding agent for the calcium oxide. The temperature of the mixture rose from 500° C. to 970° C. in passing over the catalyst. The mixture was passed over the catalyst at a space velocity of approximately 500 cubic feet of the mixture (calculated for a temperature of 970° C. on the assumption that mixture consisted wholly of vapour at that temperature) per hour per cubic foot of catalyst space. The yield of gas corresponded to 1.06 therms per gallon of oil, no tar or liquid oil residue was produced, and the carbon deposited on the catalyst amounted to 43.7 per cent. of the weight of the oil used. The composition and properties of the gas obtained will be seen from the table given below.

*Example 2*

A mixture of steam and the gas oil used in Example 1 in the ratio of 0.55:1 part was passed through a reaction tube containing particles of bauxite of ⅛ to ¼ inch diameter, the temperature of the mixture rising from 500° C. to 900° C. in its passage over the bauxite particles. The space velocity and other conditions were the same is in Example 1. The yield of gas was 1.03 therms per gallon of oil and no tar was produced. The carbon deposited on the catalyst amounted to 45.8 per cent. of the weight of the oil used. The composition and properties of the gas obtained will be seen from the table given below.

The bauxite used in this example was prepared by heating a white bauxite having the composition

| | Per cent. |
|---|---|
| $Al_2O_3$ | 56.9 |
| $Fe_2O_3$ | 2.0 |
| $SiO_2$ | 10.5 |
| $TiO_2$ | 2.1 |
| CaO and MgO | 0.5 |
| Combined water | 28.0 | at 1000° C. for one hour in order to drive off the combined water. During this heat treatment the small content of $Fe_2O_3$ was converted into a non-catalytic form, such as a silicate.

*Example 3*

The procedure was the same as in Example 1, except that the steam and oil were used in the ratio of 0.41:1 part by weight and the temperature of the mixture rose from 500° C. to 960° C. in passing over the catalyst, and that the catalyst consisted of pellets of ⅕ inch diameter of a calcium oxide-aluminum oxide catalyst prepared as follows: A mixture of 50 parts of calcium oxide, 65 parts of crushed white bauxite of the composition given in Example 2, and 10 parts of bentonite was formed into pellets and calcined at 1000° C. The yield of gas amounted to 1.15 therms per gallon of oil used, and the carbon deposited on the catalyst amounted to 32.6 per cent. on the oil used. An oil residue amounting to 1.7 per cent. on the oil used was condensed from the gas produced. The composition and properties of the gas obtained will be seen from the table given below.

*Example 4*

The procedure was the same as that described in Example 2, except that the ratio of steam to oil was 0.51:1 part, that the bauxite subjected to the preliminary heat treatment had the composition

| | Per cent. |
|---|---|
| $Al_2O_3$ | 56.0 |
| $Fe_2O_3$ | 6.2 |
| $SiO_2$ | 6.1 |
| $TiO_2$ | 2.2 |
| CaO and MgO | 0.4 |
| Combined water | 29.0 | and that the heat-treated bauxite was impregnated with a saturated solution of sodium carbonate, and then dried in air and finally in a steam oven. The bauxite had taken up 7 per cent. of its weight of sodium carbonate. The yield of gas amounted to 1.12 therms per gallon of oil used, no oil residue was obtained, and the carbon deposited on the catalyst amounted to 40.5 per cent. on the oil used.

In the foregoing Examples 1–4 the ratio of steam to oil was such that the composition of the resulting gas closely resembled that of town gas of high calorific value. A gas of lower calorific value, similar to that of coal gas which has been diluted with water gas, can be obtained by increasing the proportion of steam relatively to that of the oil. In this case a larger proportion of the carbon content of the oil reacts with the steam and a higher yield of gas is obtained. This is illustrated in the following Example 5:

*Example 5*

A mixture of steam and gas oil in the ratio of 3.2:1.0 parts was passed over pellets of a calcium oxide catalyst, so that the temperature of the mixture rose from 500° C. to 900° C., in the manner described in Example 1. The yield of gas corresponded to 1.92 therms per gallon of oil. This represents a thermal yield greater than the calorific value of the oil used, and is accounted for by the fact that the heat of formation of the gas was provided by the heat applied externally to the reaction tube. No oil residue was produced, and the carbon deposited on the catalyst amounted to 4.2 per cent. on the oil used. The composition and properties of the gas obtained will be seen from the table given below.

When it is desired to produce a gas of higher calorific value and lower specific gravity, the gas produced in this example may be washed to remove the carbon dioxide. This would raise the calorific value of the gas to 462 B. t. u. per cubic foot and reduce the specific gravity to 0.341.

In the following table are given the conditions used, and composition and other properties of the gases produced, in the foregoing examples:

| Example | 1 | 2 | 3 | 4 | 5 |
|---|---|---|---|---|---|
| Catalyst | CaO | Bauxite | Bauxite + CaO | Bauxite + $Na_2CO_3$ | CaO |
| Temperature, ° C | 970 | 900 | 960 | 900 | 900 |
| Steam/oil ratio | 0.43:1 | 0.55:1 | 0.41:1 | 0.51:1 | 3.2:1 |
| Gas Composition: | | | | | |
| $CO_2$, percent by volume | 3.2 | 2.2 | 2.6 | 3.9 | 11.6 |
| Unsaturated hydrocarbons, percent by volume | 2.3 | 3.2 | 5.7 | 3.3 | 2.1 |
| CO, percent by volume | 8.7 | 4.0 | 10.6 | 9.4 | 16.9 |
| $H_2$, percent by volume | 57.0 | 61.6 | 57.0 | 58.7 | 56.8 |
| $CH_4$, percent by volume | 28.2 | 28.8 | 23.2 | 24.0 | 12.4 |
| $C_2H_6$, percent by volume | 0.6 | 0.2 | 0.9 | 0.7 | 0.2 |
| Calorific Value in B. t. u. per cu. ft | 550 | 572 | 549 | 550 | 408 |
| Specific Gravity | 0.370 | 0.320 | 0.394 | 0.382 | 0.477 |
| Therms per gallon | 1.06 | 1.03 | 1.15 | 1.12 | 1.92 |
| Carbon deposit as a percentage of the oil | 43.7 | 45.8 | 32.6 | 40.5 | 4.2 |
| Liquid oil Residue as a percentage of the oil | Nil | Nil | 1.7 | Nil | Nil |

I claim:
1. A process for producing from a hydrocarbon oil a combustible gas consisting mainly of a mixture of methane, hydrogen and carbon monoxide, which comprises passing a mixture of the hydrocarbon oil and steam under atmospheric pressure through a catalytic mass in particulate form of which the catalyst consists of at least one compound selected from the group consisting of alumina which has been preheated to a temperature of 1000° C., lithium carbonate, sodium carbonate, potassium carbonate, calcium oxide, strontium oxide, barium oxide and magnesium oxide, and heating the mixture of oil and steam during the passage through the catalytic mass from 500° C. to a maximum temperature within the range of 750° C. to 1200° C.

2. A process as claimed in claim 1 wherein the proportion of steam in the mixture to be treated ranges from 40 to 400 percent of the weight of the hydrocarbon oil.

3. A process for producing from a hydrocarbon oil a combustible gas consisting mainly of a mixture of methane, hydrogen and carbon monoxide, which comprises passing a mixture of the hydrocarbon oil and steam under atmospheric pressure through a catalytic mass in particulate form of which the catalyst consists of at least one compound selected from the group consisting of alumina which has been preheated to a temperature of 1000° C., lithium carbonate, sodium carbonate, potassium carbonate, calcium oxide, strontium oxide, barium oxide and magnesium oxide, and heating the mixture of oil and steam during the passage through the catalytic mass from 500° C. to a maximum temperature within the range of 750° C. to 1200° C., and utilizing as at least a part of the heat required for the catalytic treatment heat produced by burning on the catalytic mass carbon deposited thereon during such a catalytic treatment previously performed.

4. A process as claimed in claim 3, wherein, when only a part of the heat required for the catalytic treatment is supplied by the combustion of the carbon deposit on the catalytic mass, additional heat is supplied by passing hot combustion gases through the catalytic mass.

5. A process as claimed in claim 3, wherein the catalytic treatment of the mixture of oil and steam and the combustion of carbon deposited on the catalytic mass are carried out in succession by passing alternately through the mass the mixture to be treated and then air to raise the temperature of the catalyst by combustion sufficiently to supply at least a part of the heat required in the succeeding catalytic treatment.

6. A process as claimed in claim 3, wherein a part of the catalytic mass is withdrawn during the catalytic treatment, air is passed through the mass withdrawn to burn the carbon deposited thereon, and the hot mass so treated is returned to the catalytic treatment zone.

7. In the process for producing a combustible gas by heating a mixture of a hydrocarbon oil and steam during its passage through a catalytic mass in particulate form from 500° C. up to a maximum temperature within the range of 750° C. to 1200° C. under atmospheric pressure for a contact period sufficient to produce a gas consisting mainly of methane, hydrogen and carbon monoxide, the improvement which consists in using a catalytic mass of which the catalyst consists of at least one compound selected from the group consisting of alumina which has been preheated to a temperature of 1000° C., lithium carbonate, sodium, carbonate, potassium carbonate, calcium oxide, strontium oxide, barium oxide and magnesium oxide.

References Cited in the file of this patent

UNITED STATES PATENTS

| Number | Name | Date |
| --- | --- | --- |
| 286,454 | Lipsey | Oct. 9, 1883 |
| 1,124,364 | Steenbergh | Jan. 12, 1915 |
| 1,128,804 | Mittasch | Feb. 16, 1915 |
| 1,796,299 | Nolan | Mar. 17, 1931 |
| 2,071,235 | Johnson | Feb. 16, 1937 |
| 2,071,286 | Johnson et al. | Feb. 16, 1937 |
| 2,405,395 | Bahlke et al. | Aug. 6, 1946 |

FOREIGN PATENTS

| Number | Country | Date |
| --- | --- | --- |
| 505,631 | France | Aug. 3, 1920 |
| 460,801 | Great Britain | Feb. 4, 1937 |